US010050239B2

(12) United States Patent
Osaki

(10) Patent No.: US 10,050,239 B2
(45) Date of Patent: Aug. 14, 2018

(54) LEAD-ACID STORAGE BATTERY

(71) Applicant: GS Yuasa International Ltd., Kyoto (JP)

(72) Inventor: Shin Osaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 16 days.

(21) Appl. No.: 14/294,653

(22) Filed: Jun. 3, 2014

(65) Prior Publication Data

US 2014/0363724 A1 Dec. 11, 2014

(30) Foreign Application Priority Data

Jun. 7, 2013 (JP) ................................ 2013-121121

(51) Int. Cl.
| | | |
|---|---|---|
| *H01M 2/02* | (2006.01) | |
| *H01M 2/18* | (2006.01) | |
| *H01M 10/06* | (2006.01) | |
| *H01M 2/16* | (2006.01) | |
| *H01M 2/20* | (2006.01) | |
| *H01M 10/12* | (2006.01) | |

(52) U.S. Cl.
CPC ......... *H01M 2/024* (2013.01); *H01M 2/0242* (2013.01); *H01M 2/1613* (2013.01); *H01M 2/18* (2013.01); *H01M 2/206* (2013.01); *H01M 10/06* (2013.01); *H01M 2/20* (2013.01); *H01M 10/121* (2013.01); *H01M 2220/20* (2013.01); *Y02E 60/126* (2013.01)

(58) Field of Classification Search
None
See application file for complete search history.

(56) References Cited

U.S. PATENT DOCUMENTS

| | | | | |
|---|---|---|---|---|
| 4,652,505 A | * | 3/1987 | Komaki | .............. H01M 10/342 |
| | | | | 429/131 |
| 4,724,190 A | | 2/1988 | Motodate | |
| 7,132,195 B2 | * | 11/2006 | Hottori | .............. H01M 2/1606 |
| | | | | 429/136 |

(Continued)

FOREIGN PATENT DOCUMENTS

| | | |
|---|---|---|
| GB | 2170348 A1 | 7/1986 |
| JP | 60-64577 | 5/1985 |

(Continued)

OTHER PUBLICATIONS

JP,2004-311357 Translation.*
Extended European Search Report dated Dec. 16, 2014 issued in the corresponding European patent application No. 14171546.6.

*Primary Examiner* — Sarah A Slifka
*Assistant Examiner* — Victoria Hom Lynch
(74) *Attorney, Agent, or Firm* — Rankin, Hill & Clark LLP

(57) ABSTRACT

In a lead-acid storage battery including a container housing elements formed by alternately layering positive electrode plates and negative electrode plates with deformable separators interposed therebetween, the container includes a narrow portion having a small inside dimension in a width direction intersecting a layered direction of the elements, widths of the respective plates are smaller than the inside dimension in the width direction of the narrow portion of the container, and widths of the separators are greater than or equal to the inside dimension of the narrow portion of the container.

17 Claims, 7 Drawing Sheets

(56) References Cited

U.S. PATENT DOCUMENTS

| | | | |
|---|---|---|---|
| 2005/0019652 A1* | 1/2005 | Fauteux | H01M 4/02 |
| | | | 429/129 |
| 2011/0059344 A1 | 3/2011 | Makino | |
| 2012/0214032 A1* | 8/2012 | Franklin | H01M 2/38 |
| | | | 429/72 |
| 2013/0202949 A1 | 8/2013 | Streuer | |

FOREIGN PATENT DOCUMENTS

| | | | |
|---|---|---|---|
| JP | 60-207262 | 10/1985 | |
| JP | 07183044 | 7/1995 | |
| JP | 09171832 | 6/1997 | |
| JP | 11111242 | 4/1999 | |
| JP | 2004-311357 A * | 4/2004 | ............ H01M 10/12 |
| JP | 2004311357 A2 | 11/2004 | |
| JP | 2009252435 A2 | 10/2009 | |
| WO | 2012048885 A1 | 4/2012 | |

* cited by examiner

LEAD-ACID STORAGE BATTERY

CROSS-REFERENCE TO RELATED APPLICATIONS

This application is based on Japanese Patent Application No. 2013-121121 filed on Jun. 7, 2013, the entire contents of which is hereby incorporated by reference.

FIELD

The present invention relates to a lead-acid storage battery.

BACKGROUND

Among lead-acid storage batteries used in various fields such as automobiles, there is one including positive electrode plates and negative electrode plates layered alternately with separators interposed therebetween in a container. There is a lead-acid storage battery as disclosed in JP-A-2004-311357, in which a separator protrudes farther than outer peripheral edges of plates in order to prevent a short circuit caused by elongation of the positive electrode plate.

However, the lead-acid storage battery in JP-A-2004-311357 is still susceptible to improvement in prevention of the short circuit between the positive electrode plate and the negative electrode plate due to elongation of the positive electrode plate. Moreover, if the plates deteriorate and active materials fall on the fallen active materials may cause a short circuit between the positive electrode plate and the negative electrode plate. Specifically the fallen active materials accumulate between end portions of the separator and inner walls of the container to cause the short circuit between the positive electrode plate and the negative electrode plate.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide a lead-acid storage battery in which a short circuit caused by elongation of the electrode plate and fall of active materials can be suppressed.

To achieve the above object, according to an aspect of the present invention, there is provided a lead-acid storage battery including a container housing an element formed by alternately layering a positive electrode plate and a negative electrode plate with a deformable separator interposed therebetween. The container includes a narrow portion having a small inside dimension in a width direction intersecting a layered direction of the element, a width of each of the plates is smaller than the inside dimension in the width direction of the narrow portion of the container, and a width of the separator is greater than or equal to the inside dimension of the narrow portion of the container.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION

Figure 1:
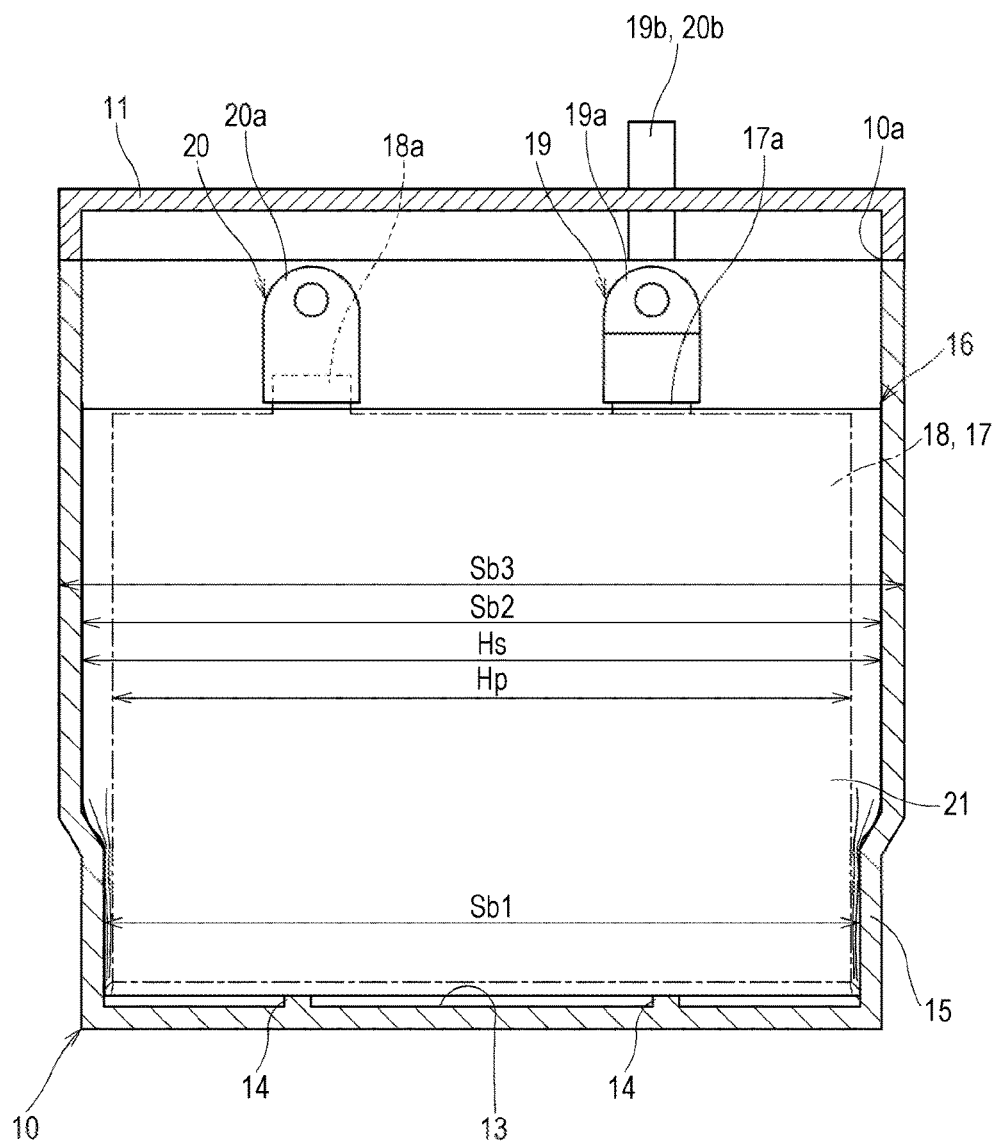
FIG. 1 shows a cross sectional view of a lead-acid storage battery in an embodiment according to the invention.

According to an aspect of the present invention, there is provided a lead-acid storage battery including a container housing an element formed by alternately layering a positive electrode plate and a negative electrode plate with a deformable separator interposed therebetween, wherein the container includes a narrow portion having a small inside dimension in a width direction intersecting a layered direction of the element, a width of each of the plates is smaller than the inside dimension in the width direction of the narrow portion of the container, and a width of the separator is greater than or equal to the inside dimension of the narrow portion of the container.

In this way, the separator is compressed on opposite sides of the respective plates in the narrow portion. As a result, the separator fills clearances between the respective plates and the container and the positive electrode plate and the negative electrode plate can be fixed to the container with large retaining force. Therefore, it is possible to suppress falling oil of active materials due to vibrations and the like. Moreover, the separator having the greater width than the plates serves as a separating wall for separating the positive electrode plate and the negative electrode plate from each other in the container. Therefore, the short circuit between the plates due to elongation of the positive electrode plate or the negative electrode plate can be reliably suppressed and the short circuit between the plates due to the active materials which have fallen off from the plates can be suppressed.

The separator may have such a width as to come in contact with inner faces of a portion of the container adjacent to the narrow portion. In this as it is possible to more reliably separate the positive electrode plate and the negative electrode plate from each other in the container to thereby more reliably suppress the short circuit between the plates due to elongation of the positive electrode plate or the negative electrode plate.

The separator may be an elastically deformable glass mat and the width of the separator may be greater than or equal to the inside dimension of the narrow portion of the container and smaller than an inside dimension in the width direction of the portion of the container adjacent to the narrow portion. In this manner, because the separator is the glass mat which can be elastically deformed by compression, the separator has higher elasticity than a separator made of polyethylene, for example, and can fix the positive electrode plate and the negative electrode plate to the container with larger retaining force. Therefore, it is possible to further suppress falling off of the active materials due to vibrations and the like. Moreover, although the separator formed by the glass mat is more liable to get damaged while rubbing against the container when the element is housed in the container, as compared with the separator made of polyethylene, for example, the width of the separator is smaller than the inside dimension in the width direction of the portion of the container adjacent to the narrow portion and therefore it is possible to suppress the damage due to rubbing against the container.

The container may in a rectangular parallelepiped shape with one side open and the narrow portion may he formed at an end portion of the container on an opposite side from the opening. In this way, it is easy to insert the element into the container, which improves workability and suppresses damage to the separator due to rubbing of the separator against the container during the insertion. Furthermore, it is possible to enhance stability of the respective plates and the separator in disposed states.

The separator may be disposed to wrap at least one of the positive electrode plate and the negative electrode plate in a U shape and a U-shaped bent portion of the separator may be positioned at the end portion of the container on the opposite side from the opening. In this way, it is possible to further suppress damage to the separator due to rubbing of the separator in inserting the element into the container, which further improves workability Furthermore, the fallen active materials are caught in the U-shaped bent portion and the bent portion catching the fallen active materials is positioned in the narrow portion of the container. Therefore, it is difficult for the fallen active materials to go around the U-shaped separator to move in the container and the short circuit between the plates can be further suppressed.

The negative electrode plates may be greater in number than the positive electrode plates by one and the separators may be disposed to wrap the positive electrode plates in the U shapes. In this was it is possible to reduce the number of separators to thereby reduce cost of the lead-acid storage battery.

The element may be housed in a pressed condition in the container. It is preferable to apply the invention to the lead-acid storage battery in which the element is pressed and an interval between the plates is short.

The negative electrode plate may be wrapped in the separator. In this way, the short circuit due to the elongation of the positive electrode plate or the negative electrode plate can be suppressed and the short circuit due to the fallen active materials can be suppressed.

The separator may be a rectangular sheet disposed on each face of the positive electrode plate and the negative electrode plate. In this way, the short circuit due to the elongation of the positive electrode plate or the negative electrode plate can be suppressed.

The separator may have a wave shape in which lower portions of the separator are bent portions and an upper portion of the separator is a folded-back portion and the positive electrode plate and the negative electrode plate may he positioned in the bent portions. In this way, the short circuit due to the elongation of the positive electrode plate or the negative electrode plate can be suppressed and the short circuit due to the fallen active materials can be further reliably suppressed.

The separator ma be formed into a sack shape s with an upper end open by joining lower end edges and edges on both sides in a lateral direction. In this way, the short circuit due to the elongation of the positive electrode plate or the negative electrode plate can be suppressed and the short circuit due to the fallen active materials can be further reliably suppressed.

A width of the separator as may be greater than the positive electrode plate or the negative electrode plate at least by 5 mm on each side. In this way, the short circuit due to the elongation of the positive electrode plate or the negative electrode plate can be suppressed.

A width of the separator may be in a range of 105% to 110% of a width of at least one of the positive electrode plate and the negative electrode plate. In this way, the short circuit due to the elongation of the positive electrode plate or the negative electrode plate can be suppressed and workability in housing the separator into the container is not reduced.

The lead-acid storage battery may be a valve-regulated lead-acid storage battery.

Preferred embodiments of the present invention will be described hereinafter with reference to the drawings.

Figure 2:
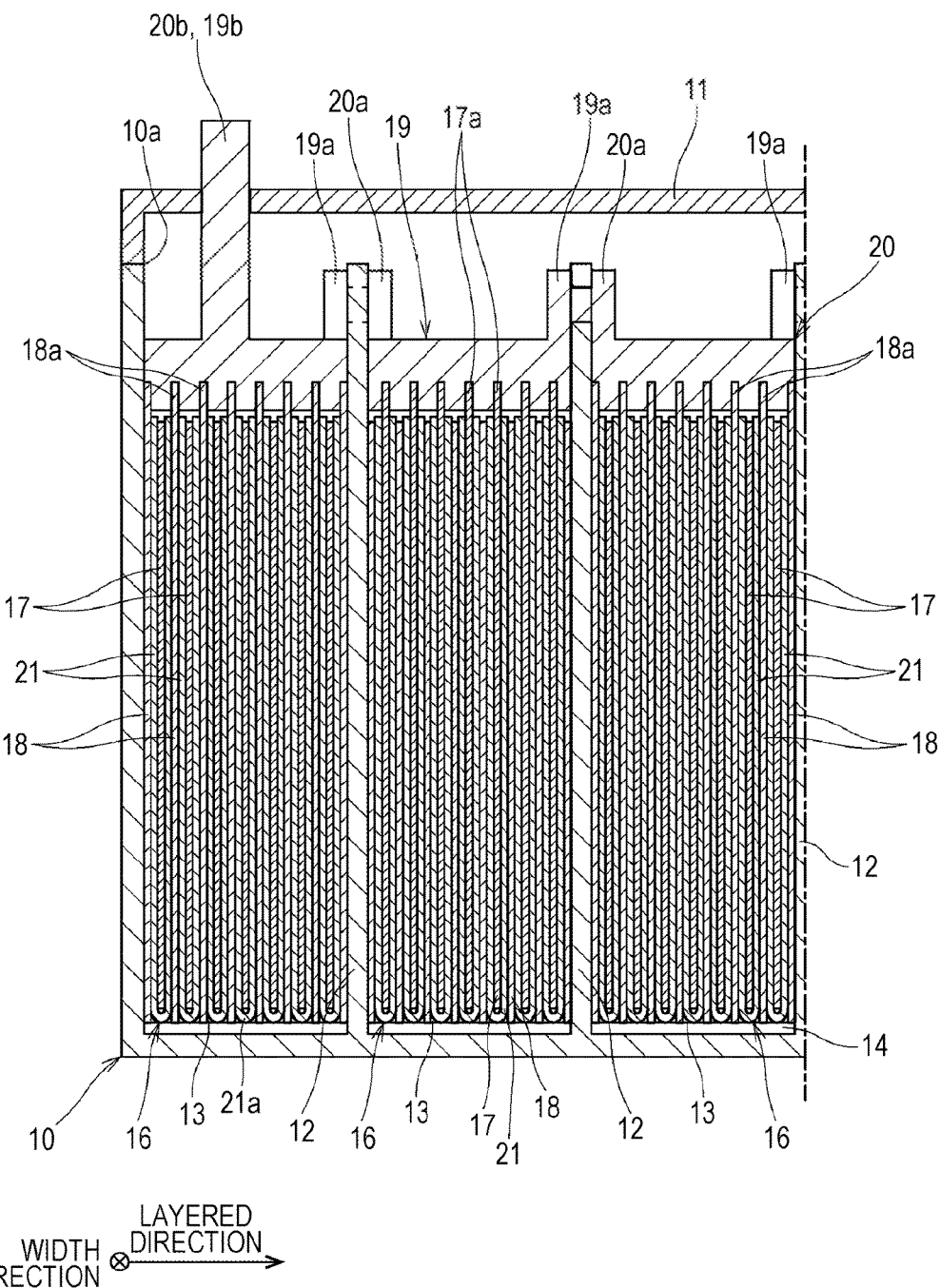
FIG. 2 shows a vertical sectional view of the lead-acid storage battery.
Figure 3:
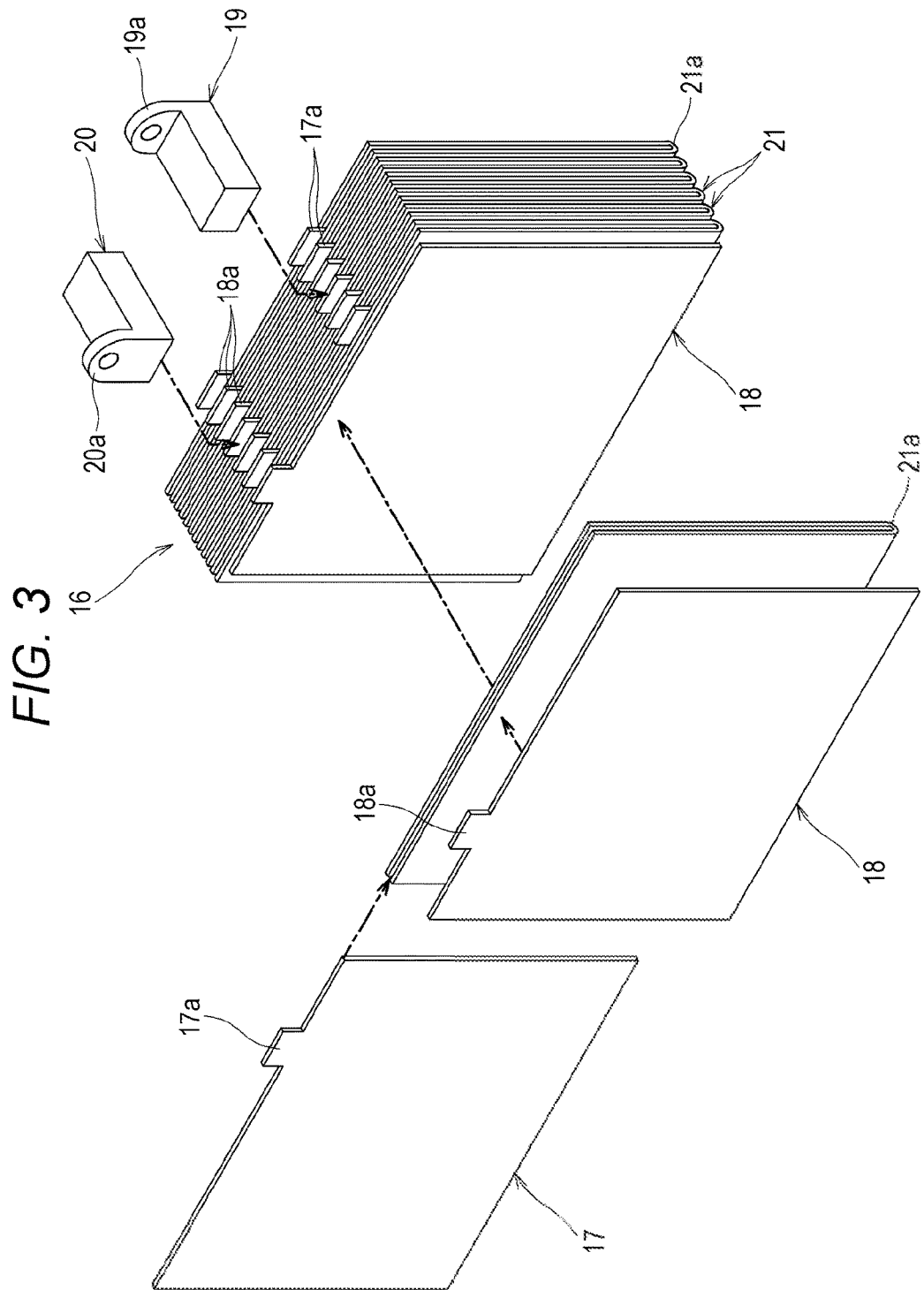
FIG. 3 shows a perspective view of structures of both plates and separators.

FIGS. 1 to 3 show a lead-acid storage battery according to the embodiment of the invention. The lead-acid storage battery is a valve regulated lead-acid storage battery mounted into a vehicle and has a structure in which positive electrode plates 17 and negative electrode plates 18 are layered with separators 21 interposed therebetween inside a container 10 and known electrolyte solution ($H_2SO_4$) (not shown) is sealed in.

As shown in FIGS. 1 and 2, the container 10 has an open-topped rectangular parallelepiped shape. An upper end opening 10a of the container 10 is sealed with a lid body 11. Inside the container 10, partitions 12 are disposed parallel at equal intervals along a layered direction of the plates 17 and 18 (a direction orthogonal to a paper surface of FIG. 1). In the embodiment, five partitions 12 are formed to divide the inside of the container 10 into six cells 13 for respectively housing elements 16. Ribs 14 protruding from a lower face of the container 10 and extending in the layered direction are provided in each of the cells 13. At an end portion (bottom side) on an opposite side from the opening 10a which is an upper portion of the container 10, a narrow portion 15 having a smaller dimension in a width direction orthogonal to the layered direction is formed. Specifically, an inside dimension Sb1 of the narrow portion 15 is smaller than an inside dimension Sb2 of a portion on a side of the upper end opening 10a above the narrow portion 15.

Each of the elements 16 includes the positive electrode plates 17 and the negative electrode plates 18 which are alternately layered with the separators 21 interposed therebetween and are disposed in the cell 13. Both the plates 17 and 18 are rectangular thin plates having substantially the same dimensions and widths Hp smaller than the inside dimension Sb1 of the narrow portion 15 of the container 10. The positive electrode plate 17 is formed by filling a grid made of Pb—Ca alloy with a positive active material mainly made of $PbO_2$. The negative electrode plate 18 is formed in filling a grid made of Pb—Ca alloy with a negative active material mainly made of Pb. As each of the grids, a cast grid, an expanded grid formed by slitting and expanding the sheet to form meshes, or a punched grid formed by punching a sheet is used. In the embodiment, the seven positive electrode plates 17 and the eight negative electrode plates 18 are layered so that the negative electrode plates 18 are positioned at opposite ends. Tab-shaped portions 17a and 18a protruding upward are respectively formed at upper end edges of both the plates 17 and 18. The tab-shaped portions 17a of the respective positive electrode plates 17 are connected by a positive electrode strap 19 and tab-shaped portions 18a of the respective negative electrode plates 18 are connected by a negative electrode strap 20.

As shown in FIGS. 1 and 3, the positive electrode strap 19 and the negative electrode strap 20 are connected to the respective tab-shaped portions 17a and 18a by a COS (Cast On Strap) method. At upper ends of the respective straps 19 and 20, connecting portions 19a and 20a for connecting the cells 13, 13 adjacent to each other are formed. The connecting portion 19a of the positive electrode strap 19 is connected to the connecting portion 20a of the negative electrode strap 20 of the element 16 disposed in the adjacent cell 13. In this way, the 12V lead-acid storage battery in which six 2V elements 16 are connected in series is formed. At the positive electrode strap 19 disposed on one end side, a positive electrode terminal 19b passing through the lid body 11 to be exposed to the outside is formed instead of the connecting portion 19a. At the negative electrode strap 20 disposed on the other end side, a negative electrode terminal 20b passing through the lid body 11 to be exposed to the outside is formed instead of the connecting portion 20a. To the respective terminals 19b and 20b, external terminals (not shown) are connected.

The separator 21 is formed by a fiber mat (e.g., AGM (absorbent glass mat) which has a function of retaining the electrolyte solution and which can be deformed elastically. Each of the separators 21 in the embodiment is of a leaf type which wraps opposite faces of the positive electrode plate 17 in a U shape and is disposed so that a bent portion 21a is positioned on a bottom side of the container 10. Specifically; the separator 21 is wound from one face side of the positive electrode plate 17 and folded back at a lower end edge to extend to the other face side. An upper end of the separator 21 protrudes farther upward than the plates 17 and 18. The separator 21 has a uniform width throughout itself before inserted into the container 10 and the width Hs of the separator 21 is greater than or equal to the inside dimension Sb1 of the narrow portion 15 and smaller than or equal to the outside dimension Sb3 of the container 10 above the narrow portion 15. The width Hs of the separator 21 in the embodiment is slightly greater than the inside dimension Sb2 above the narrow portion 15 and smaller than the outside dimension Sb3 so that the separator 21 comes in contact with inner faces of a portion of the container 10 adjacent to and above the narrow portion 15.

The separator 21 formed in this manner has the width Hs greater than the widths Hp of the adjacent plates 17 and 18 and serves as a separating wall for separating the plates 17 and 18 adjacent to each other in the cell 13 of the container 10. For example, if the inside dimension Sb1 of the narrow portion 15 of the container 10 is 154 mm and the widths Hp of the plates 17 and 18 are 148 mm, the width Hs of the separator 21 is preferably 158 mm which is greater than the plates 17 and 18 at least by 5 mm on each side (about 106%). In other words, the width Hs of the separator 21 is preferably in a range of 105% to 110% of the widths Hp of the plates 17 and 18. If the width Hs is smaller than 105% of the widths Hp, it is difficult to prevent a short circuit caused by elongation of the positive electrode plate 17 or the negative electrode plate 18. If the width Hs is greater than 110% of the widths Hp, workability in housing the separator 21 into the container 10 is reduced. A thickness of the element 16 before housed into the container 10 is greater than an inside dimension of each of the cells 13 in the layered direction.

Figure 4:
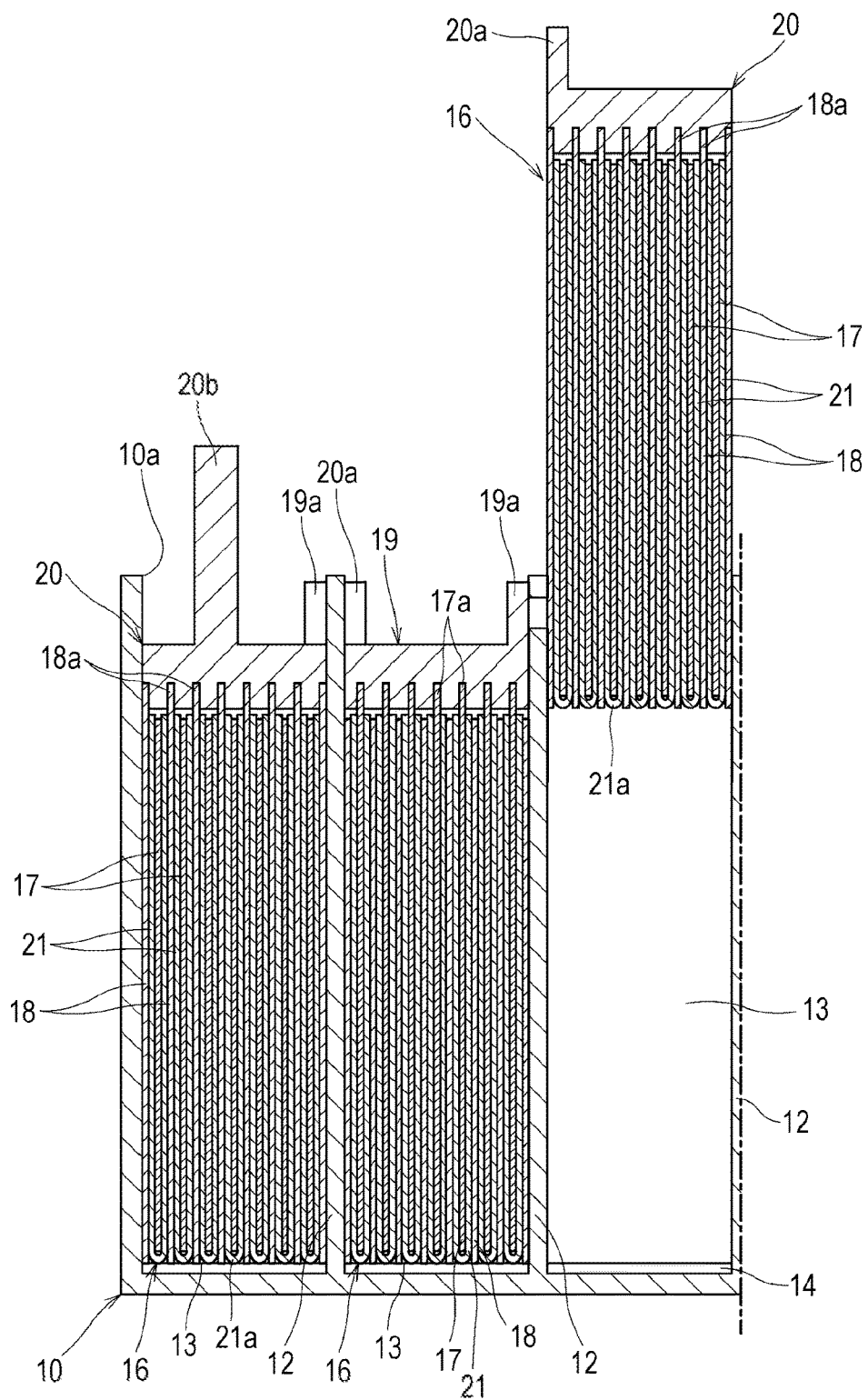
FIG. 4 shows a sectional view of an assembled state of elements.

To assemble the lead-acid storage battery, for example, the positive electrode plate 17 is wrapped in the U-shaped separator 21 and the negative electrode plate 18 is positioned on the outside as shown in FIG. 3. Then, while pressing the plates 17 and 18, which are alternately layered with the separators 21 interposed therebetween, from opposite sides, the straps 19 and 20 are connected by the COS method to the plates 17 and 18. Then, as shown in FIG. 4, the pressed element 16 is inserted into each of the divided cells 13.

After the elements 16 are disposed in all the cells 13, the positive electrode strap 19 and a negative electrode strap 20 of the adjacent cells 13 are connected and then the electrolyte solution is filled into the container 10 and the separators 21 are impregnated with the electrolyte solution. Finally, the lid body 11 is disposed at an upper portion of the container 10 to seal the inside of the container 10.

Because the widths Hs of the separators 21 are greater than or equal to the inside dimension Sb1 of the narrow portion 15 in the lead-acid storage battery, the separators 21 are deformed and compressed in the width direction on opposite sides of the respective plates 17 and 18 in the narrow portion 15 in the assembled state. As a result, the separators 21 fill clearances between the respective plates 17 and 18 and the container 10 and it is possible to position the positive electrode plates 17 and the negative electrode plates 18 in the cells 13 with large retaining force. Therefore, it is possible to suppress falling off of the active materials due to vibrations and the like. Moreover, because the narrow portion 1 is formed at the end portion of the container 10 on the opposite side from the opening 10a, it is easy to insert the elements 16 into the container 10, which improves workability and suppresses damage to the separators 21 due to rubbing of the separators 21 during insertion. Furthermore, it is possible to enhance stability of the respective plates 17 and 18 and the separators 21 in disposed states.

Because the widths Hs of the separators 21 are greater than the widths Hp of the respective plates 17 and 18 and are such dimensions that the separators 21 come in contact with the inner faces of the portions of the container 10 above the narrow portion 15 in the embodiment, the separators 21 serve as the separating walls for separating the positive electrode plates 17 and the negative electrode plates 18 from each other in the container 10. Therefore, the short circuit bet the plates 17 and 18 due to elongation of the positive electrode plate 17 or the negative electrode plate 18 can be reliably suppressed and the short circuit between the plates 17 and 18 due to the active materials which have fallen off from the plates 17 and 18 can be suppressed.

Furthermore, because the separators 21 are of the leaf types for wrapping the fewer positive electrode plates 17 in the U shapes, it is possible to reduce the necessary number of separators 21 to thereby reduce cost of the lead-acid storage battery. Moreover, because bent portions 21a of the separators 21 are disposed on a bottom side of the container 10, it is possible to suppress damage to the separators 21 due to rubbing of the separators 21 in inserting the elements 16 into the container 10 and it is possible to further improve workability. Furthermore, because the fallen active materials are caught in the bent portions 21a, it is difficult for the fallen active materials to go around the U-shaped separators 21 to move in the container 10 and it is possible to further suppress the short circuit; between the plates 17 and 18.

The lead-acid storage battery in the invention is not limited to the structure in the embodiment and can be changed in various ways.

For example, although the widths Hs of the separators 21 are greater than the inside dimension Sb2 of the container 10 above the narrow portion 15 in the embodiment, the widths Hs may be equal to or smaller than the inside dimension Sb2. In this case, because the separators 21 are elastically deformable glass mats, the separators 21 have higher elasticity than separators made of polyethylene, for example, and can fix the positive electrode plates 17 and the negative electrode plates 18 to the container 10 with larger retaining force.

Therefore, it is possible to further suppress falling off of the active materials due to vibrations and the like. Moreover, although the separators 21 formed by glass mats are more liable to get damaged while rubbing against the container 10 when the elements 16 are housed into the container 10 as compared with the separators made of polyethylene, for example, the widths of the separators 21 are smaller than the inside dimension Sb2 in the width direction of the portion of the container 10 above the narrow portion 15 and therefore it is possible to suppress the damage due to rubbing against the container 10.

Although the separator 21 before inserted into the container 10 has the uniform width throughout itself in the above embodiment, they need not be uniform, if the above-described predetermined width is obtained after the insertion into the container 10. For example, although the separator 21 has the width Hs of 158 mm throughout itself in the above embodiment, the separator 21 may have a width a 154 mm, which is equal to the inside dimension Sb1 of the narrow portion 15, at a portion in contact with the narrow portion 15 of the container 10 and a width of 158 mm at the other portion.

Figure 5:
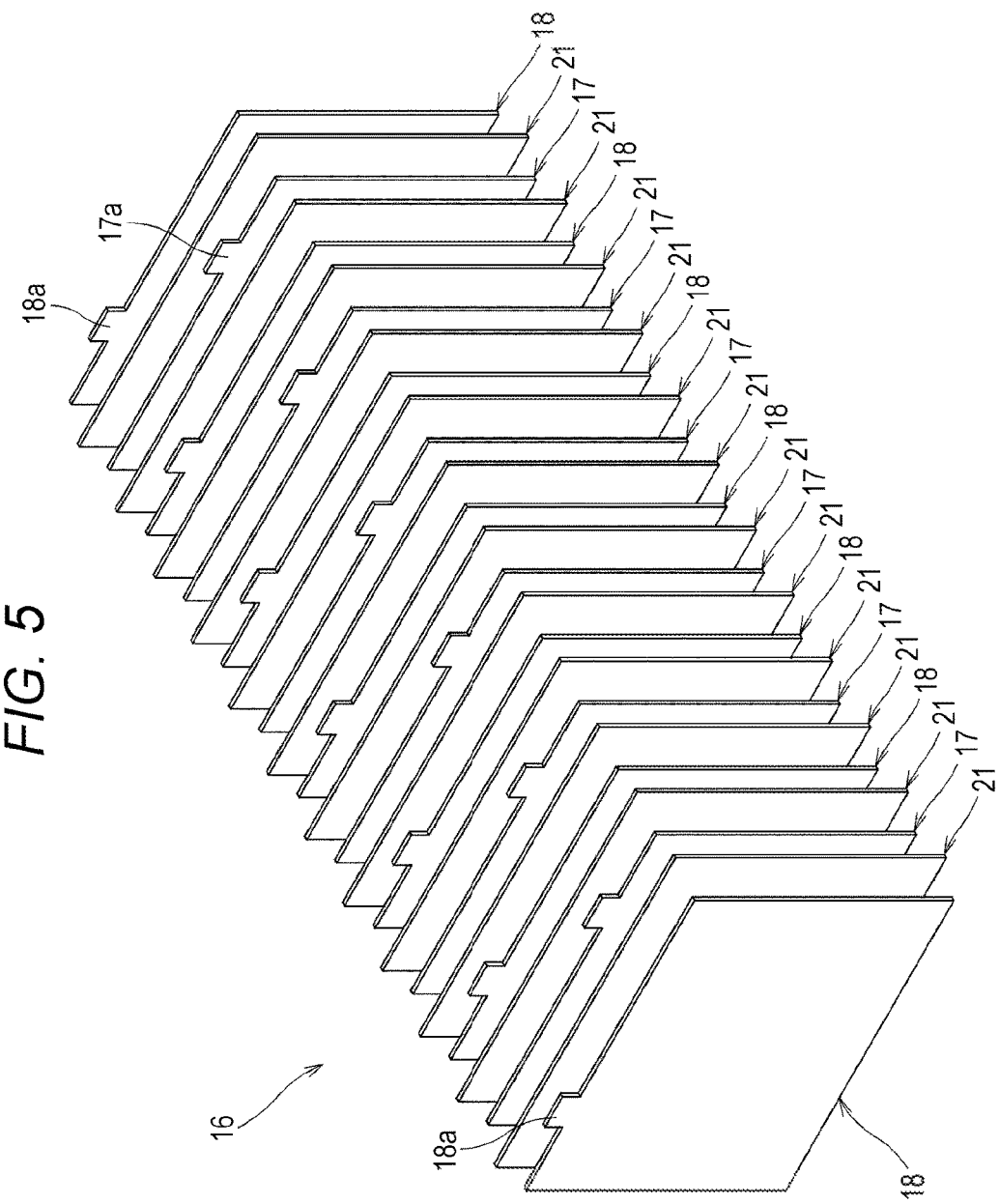
FIG. 5 shows a perspective view of a variation of the separators.

Although the positive electrode plate 17 is wrapped in the separator 21 in the above embodiment, the negative electrode plate 18 may be wrapped in the separator 21. The separator 21 is not limited to the leaf-type separator 21 for wrapping the single plate 17 or 18 in the U shape and may be a rectangular sheet disposed on each face of the plates 17 and 18 as shown in FIG. 5.

Figure 6:
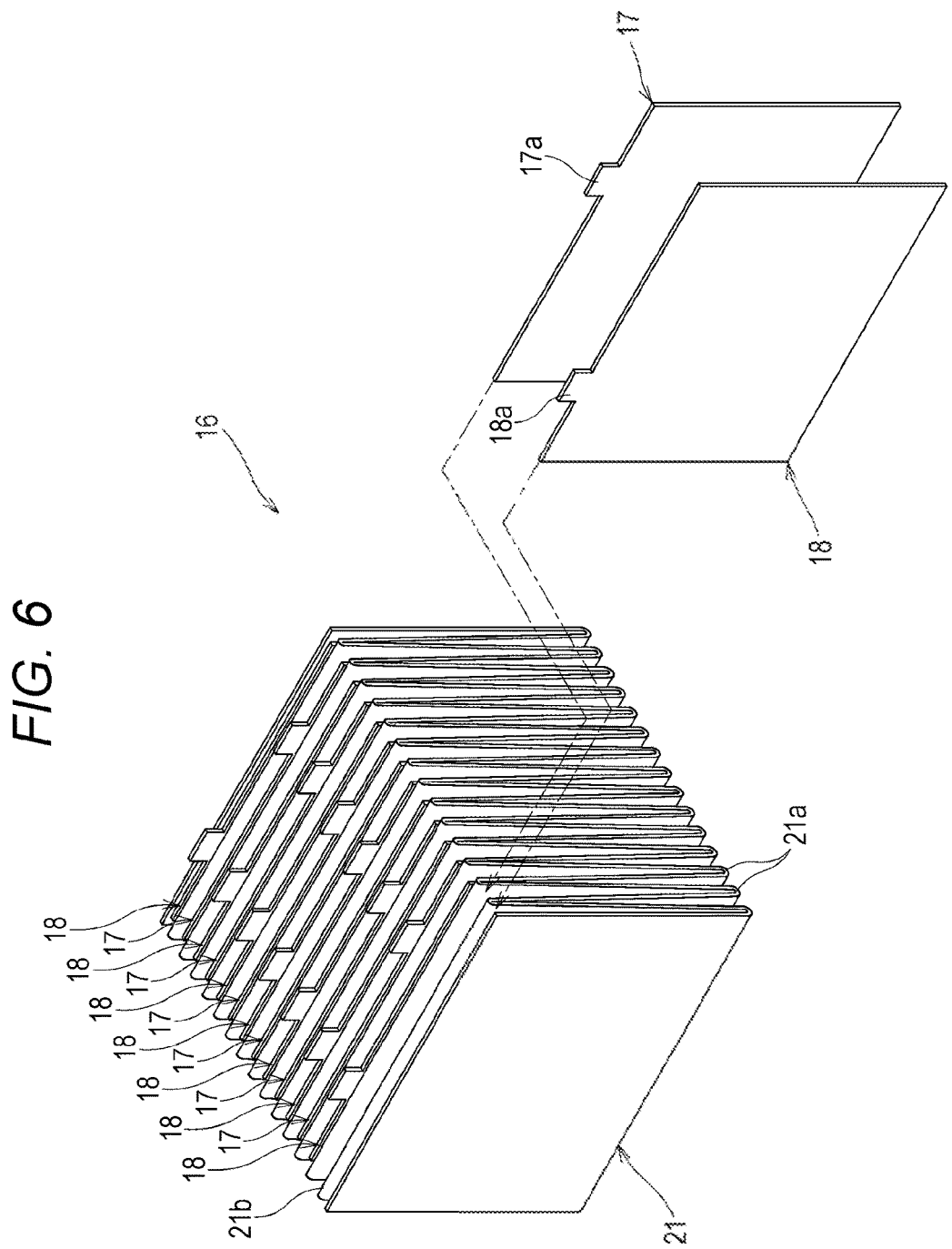
FIG. 6 is a perspective view of another variation of the separators.

Moreover, as shown in FIG. 6, the separator 21 may be in a wave shape in which all the plates 17 and 18 can be taken in and wrapped in a zig-zag fashion. In this case, lower portions of the separator 21 are bent portions 21a and upper portions are folded-back portions 21b. The respective plates 17 and 18 are disposed between the folded-back per dons 21b, 21b and positioned in the bent portions 21a. In this way, the short circuit due to the elongation of the positive electrode plate 17 or the negative electrode plate 18 can be suppressed and the short circuit due to the fallen active materials can be further reliably suppressed.

Figure 7:
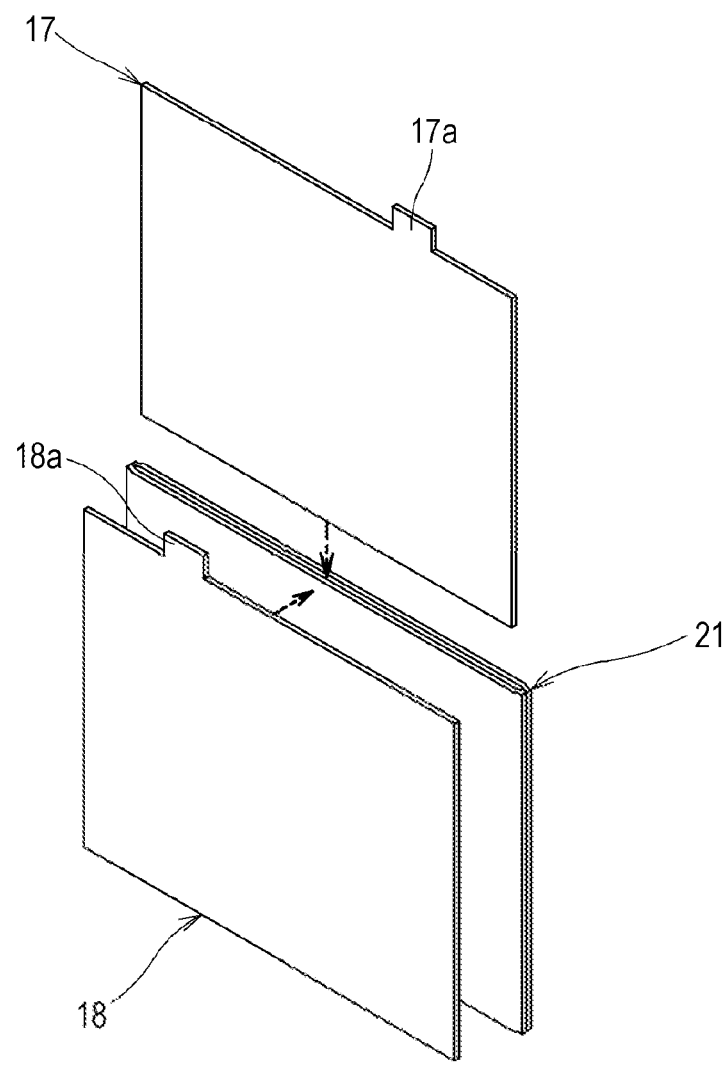
FIG. 7 is a perspective view of another variation of the separator.

As shown in FIG. 7 the separator 21 may be formed into a sack shape with only its upper end open by joining lower end edges and edges on both sides in a lateral direction by sewing or the like. In this way, the short circuit due to elongation of the positive electrode plate 17 or the negative electrode plate 18 and the short: circuit due to the fallen active materials can be further reliably suppressed.

Although the valve-regulated lead-acid storage has been described in the above embodiment, the invention can be applied to lead-acid storage batteries in which separators 21 are disposed between positive electrode plates 17 and negative electrode plates 18 and similar operation and effects can be obtained.

According to an aspect of the invention, the separators are compressed in the narrow portion to fill the clearances between the respective plates and the container and therefore the positive electrode plates and the negative electrode plates can be fixed to the container with large retaining force in the lead-acid storage battery. As a result, it is possible to suppress falling off of the active materials due to vibrations and the like. Moreover, the separators serve as separating walls for separating the positive electrode plates and the negative electrode plates from each other in the container. Therefore, the short circuit between the plates due to elongation of the positive electrode plate or the negative electrode plate can be suppressed and the short circuit between the plates due to the active materials which have fallen off from the plates can be suppressed.

What is claimed is:

1. A lead-acid storage battery comprising a container housing an element formed by alternately layering a positive electrode plate and a negative electrode plate with a deformable separator interposed therebetween,
   wherein the container includes a narrow portion having a small inside dimension in a width direction intersecting a layered direction of the element,
   a width of each of the plates is smaller than the inside dimension in the width direction of the narrow portion of the container,
   a width of at least a portion of the separator before the separator is inserted into the container is greater than the inside dimension of the narrow portion of the container and is equal to or greater than an inside dimension of the container other than the narrow portion, the portion being in contact with the narrow portion,
   the separator is compressed in the width direction in the narrow portion when the separator is inserted into the container, and
   the separator fills a clearance between the container and each of the positive electrode plate and the negative electrode plate.

2. The lead-acid storage battery according to claim 1, wherein the separator is an elastically deformable glass mat.

3. The lead-acid storage battery according to claim 1, wherein the separator has such a width that the separator comes in contact with inner faces of a portion of the container adjacent to the narrow portion.

4. The lead-acid storage battery according to claim 1,
   wherein the container is in a rectangular parallelepiped shape with one side open and
   the narrow portion is formed at an end portion of the container on an opposite side from the opening.

5. The lead-acid storage battery according to claim 4,
   wherein the separator is disposed to wrap at least one of the positive electrode plate and the negative electrode plate in a U shape and
   a U-shaped bent portion of the separator is positioned at the end portion of the container on the opposite side from the opening.

6. The lead-acid storage battery according to claim 5,
   wherein the negative electrode plates are greater in number than the positive electrode plate by one and the separator is disposed to wrap the positive electrode plate in the U shape.

7. The lead-acid storage battery according to claim 1, wherein the element is housed in a pressed condition in the container.

8. The lead-acid storage battery according to claim 1,
   wherein the separator is disposed to wrap the negative electrode plate in a U shape.

9. The lead-acid storage battery according to claim 1,
   wherein the separator is a rectangular sheet disposed on each face of the positive electrode plate and negative electrode plate.

10. The lead-acid storage battery according to claim 1,
    wherein the separator has a wave shape in which lower portions of the separator are bent portions and an upper portion of the separator is a folded-back portion, and the positive electrode plate and the negative electrode plate are positioned in the bent portions.

11. The lead-acid storage battery according to claim 1, wherein the separator is formed into a sack shape with an upper end open by joining lower end edges and edges on both sides in a lateral direction.

12. The lead-acid storage battery according to claim 1, wherein the width of the separator is greater than the positive electrode plate or the negative electrode plate at least by 5 mm on each side.

13. The lead-acid storage battery according to claim 1, wherein the width of the separator is in a range of 105% to 110% of a width of at least one of the positive electrode plate and the negative electrode plate.

14. The lead-acid storage battery according to claim 1, wherein the lead-acid storage battery is a valve-regulated lead-acid storage battery.

15. A lead-acid storage battery comprising a container housing an element formed by alternately layering a positive electrode plate and a negative electrode plate with a deformable separator interposed therebetween,
wherein the container includes a narrow portion having a small inside dimension in a width direction intersecting a layered direction of the element,
a width of each of the plates is smaller than the inside dimension in the width direction of the narrow portion of the container,
the separator before inserted into the container has a uniform width that is greater than the inside dimension of the narrow portion of the container and is equal to or greater than an inside dimension of the container other than the narrow portion,
the separator is compressed in the width direction in the narrow portion when the separator is inserted into the container, and
the separator fills a clearance between the container and each of the positive electrode plate and the negative electrode plate.

16. A lead-acid storage battery comprising a container housing an element formed by alternately layering a positive electrode plate and a negative electrode plate with a deformable separator interposed therebetween,
wherein the container includes a narrow portion having a small inside dimension in a width direction intersecting a layered direction of the element,
a width of each of the plates is smaller than the inside dimension in the width direction of the narrow portion of the container,
a width of the separator is greater than or equal to the inside dimension of the narrow portion of the container,
at least a portion of the separator is in contact with an inner surface of a portion of the container, the portion of the container is other than the narrow portion,
the separator is compressed in the width direction in the narrow portion when the separator is inserted into the container, and
the separator fills a clearance between the container and each of the positive electrode plate and the negative electrode plate.

17. The lead-acid storage battery according to claim 16, wherein the container includes a bottom wall and a side wall which extends from the bottom wall, and
wherein the side wall includes a first wall portion which forms the narrow portion and a second wall portion which forms the portion of the container other than the narrow portion, the first wall and the second wall extend in a direction perpendicular to the bottom wall.

* * * * *